(12) United States Patent
Saitoh et al.

(10) Patent No.: US 8,553,306 B2
(45) Date of Patent: Oct. 8, 2013

(54) OPTICAL DEFLECTOR AND OPTICAL DEVICE

(75) Inventors: Tetsurou Saitoh, Sendai (JP); Eiji Mochizuki, Sendai (JP); Yukito Sato, Sendai (JP); Yoshiaki Yasuda, Tokyo (JP); Masahiro Akamatsu, Tokyo (JP); Masanao Tani, Tokyo (JP)

(73) Assignees: Ricoh Company, Ltd., Tokyo (JP); Stanley Electric Co., Ltd., Tokyo (JP)

( * ) Notice: Subject to any disclaimer, the term of this patent is extended or adjusted under 35 U.S.C. 154(b) by 825 days.

(21) Appl. No.: 12/048,694

(22) Filed: Mar. 14, 2008

(65) Prior Publication Data

US 2008/0225363 A1    Sep. 18, 2008

(30) Foreign Application Priority Data

Mar. 15, 2007 (JP) ................................. 2007-066955
Mar. 12, 2008 (JP) ................................. 2008-062011

(51) Int. Cl.
*G02B 26/08* (2006.01)

(52) U.S. Cl.
USPC ...................... 359/200.8; 359/224.1; 359/904

(58) Field of Classification Search
USPC .......... 359/198.1–199.4, 200.6–200.8, 202.1,
359/221.2, 223.1–225.1, 226.2, 838, 846,
359/871, 872, 290–295, 904; 250/204,
250/559.06, 559.29, 230, 234;
347/255–260; 353/39, 98–99;
385/15–18, 22; 398/12, 19, 45
See application file for complete search history.

(56) References Cited

U.S. PATENT DOCUMENTS 7,482,730 B2 * 1/2009 Davis et al. .................... 310/311
7,934,808 B2 * 5/2011 Silverbrook .................... 347/54
2005/0179976 A1 * 8/2005 Davis et al. .................... 359/224
2007/0146858 A1 * 6/2007 Matsuda ....................... 359/224
2010/0060966 A1 * 3/2010 Cheong et al. ............. 359/221.2
2012/0227846 A1 * 9/2012 Bhaskaran et al. ........... 137/831

FOREIGN PATENT DOCUMENTS

| JP | 6-180428 | 6/1994 |
| JP | 7-175005 | 7/1995 |
| JP | 2579111 | 11/1996 |
| JP | 2722314 | 11/1997 |
| JP | 10-197819 | 7/1998 |
| JP | 3129219 | 11/2000 |
| JP | 2001-272626 | 10/2001 |
| JP | 2003-29191 | 1/2003 |
| JP | 2003-121776 | 4/2003 |
| JP | 2005-128147 | 5/2005 |

* cited by examiner

*Primary Examiner* — Jennifer L. Doak
(74) *Attorney, Agent, or Firm* — Oblon, Spivak, McClelland, Maier & Neustadt, L.L.P.

(57) ABSTRACT

An optical deflector includes a plurality of piezoelectric unimorph oscillating bodies (210a to 210d) that cause a reflecting plate (1) to oscillate rotationally, centering upon a pair of flexible support units (2a and 2b). The optical deflector forms a single structure of the oscillating plates (23a to 23b), the reflecting plate (1), the flexible support units (2a and 2b), and a support body (9), by connecting one set of the terminals of the oscillating plates (23a to 23d) of the suite of piezoelectric unimorph oscillating bodies (210a to 210d) to the flexible support units (2a and 2b), and connecting the other set of terminals to the support body (9). Furthermore, the plurality of piezoelectric unimorph oscillating bodies (210a to 210d) each respectively comprise a plurality of parallel oscillating bodies (23a1 to 23a-3, 23b-1 to 23b-3, 23c-1 to 23c-3), and (23d-1 to 23d-3), and a suite of parallel actuators (28a-1 to 28a-3, 28c-1 to 28c-3, and 28d-1 to 28d-3).

21 Claims, 8 Drawing Sheets

FIG. 3A
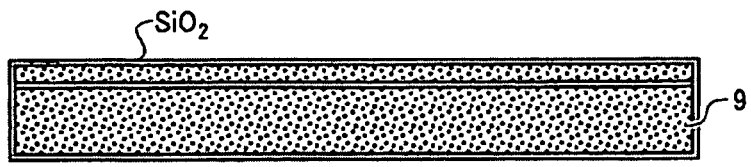
FIG. 3B
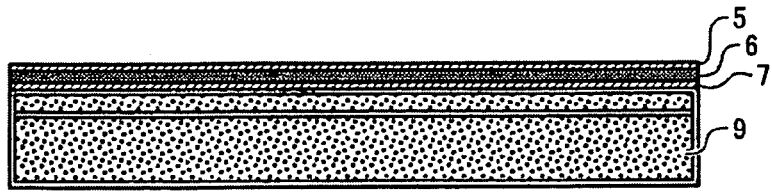
FIG. 3C
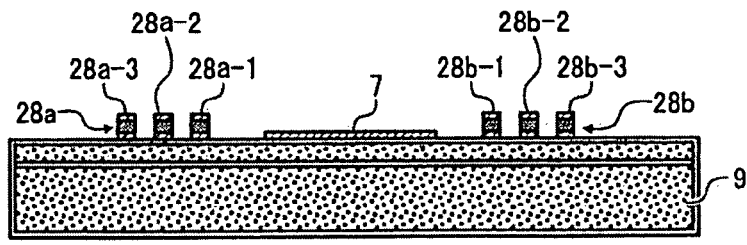
FIG. 3D
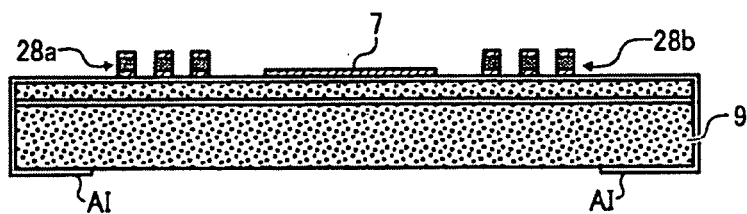
FIG. 3E
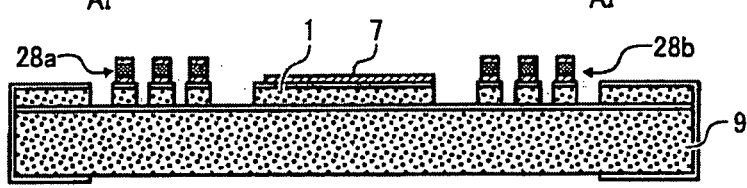
FIG. 3F
FIG. 3G
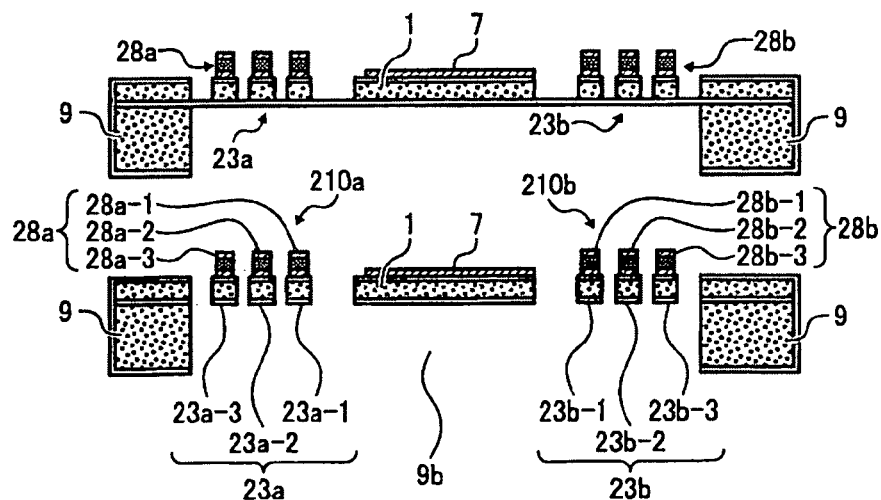

OPTICAL DEFLECTOR AND OPTICAL DEVICE

CROSS REFERENCE TO THE RELATED APPLICATIONS

The present application is based on and claims priority from each of Japanese Application Numbers 2007-66955, filed on Mar. 15, 2007, and 2008-62011, filed on Mar. 12, 2008, the disclosure of which is hereby incorporated by reference herein in its entirety.

BACKGROUND OF THE INVENTION

1. Field of the Invention

The present invention relates to an optical deflector that deflects and optically scans an incoming light, in particular, to an optical deflector that includes a movable base that is capable of being operated both at high speed and at large amplitude, and to an optical device that employs the optical deflector.

2. Description of Related Art

Conventionally, an optical deflector, which deflects and scans a beam of light, such as a laser light, is employed across a wide range of optical hardware, such as an electrophotographic copier, a laser beam printer, or a bar code reader. The optical deflector is also used in such hardware as a display device, which scans the laser light and projects an image thereby.

Such as a polygon mirror or a Galvano mirror are generally established as an optical deflector that performs an optical deflection in a mechanical fashion; refer to such as Japanese Patent Laid Open No. H07-175005, Japanese Patent Laid Open No. H06-180428, and Japanese Patent Laid Open No. 2003-121776. The Galvano mirror optical deflector is more amenable to miniaturization than the polygon mirror optical deflector. A prototype of a micro mirror, which employs a silicon substrate and which is manufactured using a micro machine technology, has been reported in particular as a miniature optical deflector.

The optical deflector that is disclosed according to Japanese Patent Laid Open No. H07-175005 is characterized by using electromagnetic power as to drive the optical deflector, and is configured so as to include a left-right symmetrical pair of permanent magnets that are positioned over or upon a base of the optical deflector, and a driving coil that is positioned in an external periphery of a reflecting mirror, wherein an electrical driving current is passed through the driving coil, alternating in a regular and a reverse manner. When the alternating regular and reverse electrical driving current is passed through the driving coil, the reflecting mirror unit is made to oscillate via a Lorentz Force that arises from an external magnetic field that is generated by the symmetrical pair of permanent magnets and the current that flows through the driving coil.

The optical deflector that uses the electromagnetic force experiences a decline in the Lorentz Force as an angle of deflection increases, and if an angle of rotation of the mirror is to be set to a large angle, it is consequently necessary either to increase the magnetic force of the permanent magnet, or else to increase the electrical current in the coil, with either approach incurring an increase in size and power consumption. Another problem is that a need to attach the permanent magnet prevents significantly reducing a size of an element.

The optical deflector that is disclosed according to Japanese Patent Laid Open No. H06-180428 is driven by using static electricity, with a driving electrode positioned directly beneath the reflecting mirror, in opposition thereto, with a minute gap therebetween, and a capacitor is configured from the mirror that is formed from a conductor, together with the driving electrode. The driving electrode is formed so as to be divided left and right, treating an axis of rotation of the mirror as an axis of symmetry thereof. When an electrical voltage is applied to an interval between the mirror and the driving electrode, the static electricity is generated, and the mirror is attracted toward the driving electrode, whereas applying the voltage alternately to the left hand and the right hand driving electrode causes the mirror to oscillate, revolving around the axis of rotation thereof.

While the optical deflector that uses the static electricity has an advantage in that it can be miniaturized because it can be manufactured solely using a semiconductor process, the static electricity is inversely proportional to the square of the distance between the mirror and the driving electrode, and thus, it is necessary to narrow the gap between the mirror and the driving electrode in order to apply sufficient static electricity to cause the mirror to oscillate.

Consequently, a rotational movement of the mirror is restricted by a contact between the mirror and the driving electrode, and thus, the angle of rotation of the mirror cannot be made large. Another problem is the format of driving by static electricity typically demands a high driving voltage of not less than 50 volts, which requires a dedicated driver IC.

The optical deflector that is disclosed according to Japanese Patent Laid Open No. 2003-121776 is driven by using static electricity, with a driving electrode positioned directly to a side of the reflecting mirror, in a comb-like fashion thereto, with a minute gap therebetween, and a capacitor is configured between the opposing comb-like driving electrodes. When an electrical voltage is applied to the interval between the opposing comb-like driving electrodes, the static electricity is generated, and the mirror is attracted toward the driving electrodes to either side thereof, and the force that causes the initial attraction, i.e., an initial inclination of the mirror, applies a force that causes the mirror to revolve around the axis of rotation thereof, and thus, causes the mirror to oscillate as a result.

While the optical deflector that uses the static electricity has an advantage in that it can be miniaturized because it can be manufactured solely using a semiconductor process, the static electricity ceases to have an effect as the angle of oscillation of the mirror increases and the teeth of the opposing comb come apart, and thus, it is not possible to make the angle of rotation of the mirror into a large angle.

Thus, the conventional optical deflector that uses electromagnetism or static electricity suffers from the problem of it not being possible to set the angle of rotation of the mirror to a large angle.

Accordingly, an optical deflector has been proposed that uses an oscillation of a piezoelectric actuator, as a technology that resolves such a problem as the foregoing; refer to Japanese Patent Laid Open No. H10-197819, Japanese Patent Laid Open No. 2001-272626, and Japanese Patent Laid Open No. 2003-29191.

The optical deflector that is disclosed according to Japanese Patent Laid Open No. H10-197819 comprises a plate shaped micro-mirror, a pair of rotation support bodies that support both sides of the micro-mirror, a framework unit that surrounds a periphery thereof, and a piezoelectric actuator that applies a translational motion to the framework unit.

The optical deflector that is disclosed according to Japanese Patent Laid Open No. 2001-272626 includes a support body, a voltage oscillator that is anchored to the support body and that moves in a reciprocating motion, a flexible body that is connected to the voltage oscillator, and a reflection plate that oscillates by being driven by the voltage oscillator, by way of the flexible body.

The optical deflector that is disclosed according to Japanese Patent Laid Open No. 2003-29191, with regard to a transformation mechanism thereof, links one end of each of a pair of columnar units via a hinge unit, interposes an actuator between the other end of each of the pair of columnar units, and positions a mirror, a flexible support unit, and a support substrate in a location upon or above the hinge unit.

What the preceding conventional technologies have in common is the fact that the piezoelectric actuator is conjoined to the mirror element substrate by way of the flexible body, and the oscillation of the piezoelectric actuator is thereby transformed into the rotational motion of the mirror. The optical deflector that uses the piezoelectric actuator is not restricted with regard to the rotation of the mirror, and thus, it is possible to obtain a large angle of deflection.

With regard to the preceding conventional technology, however, an optical deflector that comprises an assembly that transforms the translational motion of the piezoelectric actuator, by way of the flexible body, into the rotational motion of the mirror suffers from such problems as needing to conjoin, i.e., to attach, a plurality of configuration components to one another with a high degree of precision, such as the base plate, the piezoelectric actuator, the flexible body, and the mirror substrate, in order for the oscillation to be transmitted in an effective manner from the piezoelectric actuator to the mirror, and even if no problem is present with the conjoining of the plurality of components, it is possible that not all of the translational motion of the piezoelectric actuator may be transformed into the rotational motion, and thus, the mirror performs the translational motion as well as the rotation, which may result in a deviation in the beam light thereby.

The optical deflector according to the preceding conventional technology also suffers from the following problems from a process standpoint, in that it is difficult to miniaturize, owing to the fact that a bulk ceramic piezoelectric actuator and a flexible body that is formed from a metal plate or a rod is used as the configuration component therein, and furthermore, the fact that each respective configuration element is conjoined, i.e., assembled, using such as adhesives or solder means that it is not possible to assemble the configuration elements at a level of a silicon wafer, such as with a semiconductor device.

Thus, it is clear that the optical deflector that is implemented with the preceding conventional technology is neither significantly smaller, faster, or capable of achieving a significantly larger angle of displacement than the optical deflector that is implemented with the polygon mirror or the Galvano mirror, and, accordingly, an optical deflector has been desired that would be easy to manufacture using the semiconductor process technology, and, moreover, that would include both a high speed and a large angle of displacement.

Accordingly, an oscillating mirror has been proposed that is suited to being manufactured using the semiconductor process technology, as a technology that resolves the preceding problems; refer to Japanese Patent Laid Open No. 2005-128147.

The technology that is disclosed according to Japanese Patent Laid Open No. 2005-128147 involves forming an optical deflector of a piezoelectric unimorph oscillating body, a support body that includes a cavity unit that anchors and supports an end of a piezoelectric unimorph film that is formed directly upon or over the support body, a flexible body that is connected to the piezoelectric unimorph oscillating body and a reflecting plate that oscillates in a rotational manner within the cavity unit, in response to a driving impulse of the piezoelectric unimorph oscillating body, by way of the flexible body, wherein the piezoelectric unimorph oscillating body, the support body, the flexible body, and the reflecting plate are formed as a single structure.

Put another way, as depicted in FIG. 7, the technology that is disclosed according to Japanese Patent Laid Open No. 2005-128147 comprises a reflecting plate 01, a support body 09 that supports the reflecting plate 01, and a piezoelectric unimorph oscillating body 010, which causes the reflecting plate 01 to oscillate in a rotational manner. The piezoelectric unimorph oscillating body 010 comprises an oscillating plate 03*a* to 03*d* and a piezoelectric actuator 08*a* to 08*d*, which is formed from the voltage film that is formed directly upon or over the support body 09, wherein each respective oscillating plate 03*a* to 03*d* is connected to the support body 09 and the reflecting plate 01. The reflecting plate 01 is supported by the support body 09, by way of a flexible support unit 02*a* and 02*b*.

The oscillating plate 03*a* to 03*d*, the support body 09, the flexible support unit 02*a* and 02*b*, and the reflecting plate 01 are formed of a single structure.

An operation of the preceding conventional optical deflector will be described hereinafter with reference to FIG. 8. FIG. 8 is a sectional cutaway view at a line between a point S10 to S10 in FIG. 7.

An alternating current, e.g., a sinusoidal current, is applied in phase to the piezoelectric actuator 08*a* and 08*b*, and to the piezoelectric actuator 08*c* and 08*d* in either an inverse phase or out of phase, thus causing the oscillating plate 03*a* and 03*b*, and the oscillating plate 03*c* and 03*d*, to oscillate. One end of each respective oscillating plate 03*a* and 03*b*, and one end of each respective oscillating plate 03*a* and 03*b* is anchored to and maintained in contact with the support body 09, and thus, while a lead drive unit 04*a*, 04*b*, 04*c*, and 04*d* oscillate in a vertical direction as denoted by an arrow R, the oscillation of the lead drive unit 04*a* and 04*b* is in a phase difference with the oscillation of the lead drive unit 04*c* and 04*d*. In particular, when the phase of the applied voltage is the inverse phase, the direction of the oscillation of the lead drive unit 04*a* and 04*b* is directly opposite to the oscillation of the lead drive unit 04*c* and 04*d*.

Put another way, when the lead drive unit 04*a* and 04*b* move in the upward direction, the lead drive unit 04*c* and 04*d* move in the downward direction. In such a circumstance, a rotational torque, which is centered on the flexible support unit 02*a* and 02*b*, acts on the reflecting plate 01, causing the reflecting plate 01 to incline around a center axis of the flexible support unit 02*a* and 02*b*. A repeated vertical oscillation of each respective lead drive unit 04*a* and 04*b* and of each respective lead drive unit 04*c* and 04*d*, in response to the alternating current applied thereto, causes the rotational torque to act on the reflecting plate 01 in a see-saw manner, and thus, the reflecting plate 01 repeatedly oscillates in a rotational manner until it reaches a prescribed angle. The reflecting plate 01 oscillates in a rotational manner that is similar to the preceding, even when the lead drive unit 04*a* and 04*b* and the lead drive unit 04*c* and 04*d* are oscillating in the phase difference, rather than in the inverse phase.

When a driving frequency of the piezoelectric actuator 08*a*, 08*b*, 08*c*, and 08*d* is identical with or close to a mechanical resonance frequency of an assembly that brings together the reflecting plate 01 and the flexible support unit 02*a* and 02*b*, i.e., a movable mirror unit, the rotational oscillation of the reflecting plate 01 reaches its maximum, and a maximum angle of displacement may be obtained thereby, Setting the resonance frequency of the oscillating plate 03*a*, 03*b*, 03*c*, and 03d to be either identical with or close to the resonance frequency of the movable mirror unit makes it possible to obtain a large angle of rotation of the movable mirror unit. It is to be understood that it is possible to cause the reflecting plate 01 to oscillate in the rotational manner at the drive frequency of the piezoelectric actuator 08a, 08b, 08c, and 08d, even if the angle of rotation becomes small.

FIG. 9 shows an enlargement of a conjoining of the lead drive unit 04d and the reflecting plate 01, and, as depicted in the drawing, the oscillating plate 03d is conjoined to the reflecting plate 01 by way of the lead drive unit 04d.

Whereas a width W01 of each respective lead drive unit 04a, 04b, 04c, and 04d, however, is set so as to be greater than a width W02 of the flexible support body 02a and 02b, and to be resistant to distortion, making each respective lead drive unit 04a, 04b, 04c, and 04d too large makes a mass of each respective lead drive unit 04a, 04b, 04c, and 04d excessively large, and causes the amplitude of each respective lead drive unit 04a, 04b, 04c, and 04d to become small. Hence, a limit exists to an extent to which a durability of each respective lead drive unit 04a, 04b, 04c, and 04d may be increased.

Consequently, when the oscillating plate 03a to 03d is oscillating in a circumstance, and the force that is generated thereby is transmitted to the reflecting plate 01, wherein each respective lead drive unit 04a, 04b, 04c, and 04d is actually oscillating, then an alteration occurs in each respective lead drive unit 04a, 04b, 04c, and 04d, such as is depicted in FIG. 10, and as a result, the force is not sufficiently transmitted to the reflecting plate 01, and the angle of oscillation cannot be made large.

Thus, it is clear that the optical deflector that is implemented with the preceding conventional technology is neither significantly smaller, faster, or capable of achieving a significantly larger angle of displacement than the optical deflector that is implemented with the polygon mirror or the Galvano mirror, and, accordingly, an optical deflector has been desired that would be easy to manufacture using the semiconductor process technology, and, moreover, that would include both a high speed and a large angle of displacement.

SUMMARY OF THE INVENTION

An object of the present invention is to provide an optical deflector and an optical device that facilitates a single form assembly of a mirror base plate, i.e., a support body, and a piezoelectric actuator, that is capable of keeping an axial deviation under control and preventing a translational motion of the mirror being caused by an effect of a voltage oscillation, that is capable of a high speed operation, that is capable of obtaining a large angle of deflection and an operation at a large amplitude, and that also facilitates miniaturization, reduced thinness, and reduced mass and weight thereof.

In order to achieve the above object, an optical deflector according to one embodiment of the present invention includes a movable plate configured to be capable of reflecting light, a pair of torsion bars configured to support movably and oscillatably the movable plate, each of the torsion bars having one end be anchored to the movable plate and another end anchored to a support body, and at least one piezoelectric unimorph oscillating body configured to cause the movable plate to rotationally oscillate.

The piezoelectric unimorph oscillating body includes a plurality of oscillating plates and a plurality of piezoelectric actuators, configured to drive the oscillating plates.

One end of each of the oscillating plates is connected to the torsion bar, and another end of each of the oscillating plates is connected to the support body.

The oscillating plates, the movable plate, the torsion bars, and the support body are formed of a single structure.

BRIEF DESCRIPTION OF THE DRAWINGS

FIG. 3A to 3G are explanatory views showing sequences of forming the optical deflector A according to the first embodiment.

DETAILED DESCRIPTION OF THE PREFERRED EMBODIMENTS

Preferred embodiments of the present invention will be explained in detail hereinafter, with reference to the accompanying drawings.

First Embodiment

Figure 1:
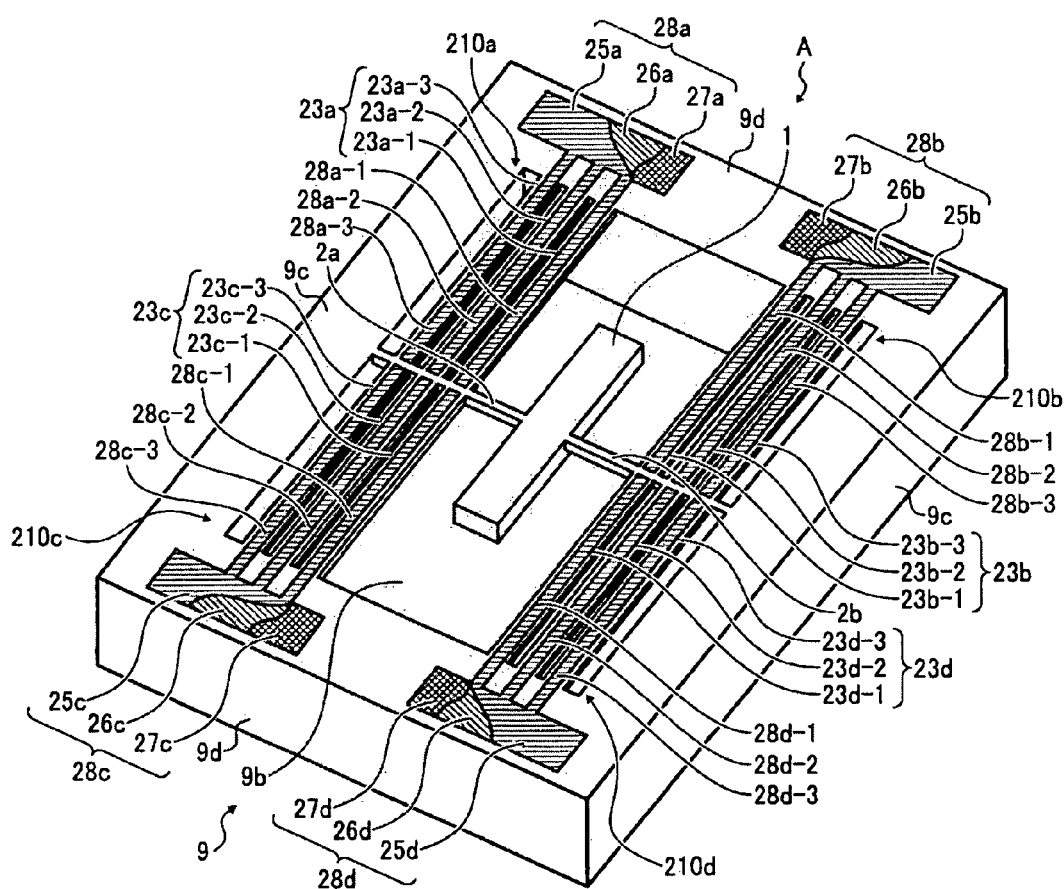
FIG. 1 is a perspective view showing an optical deflector A according to a first embodiment of the present invention.
Figure 2:
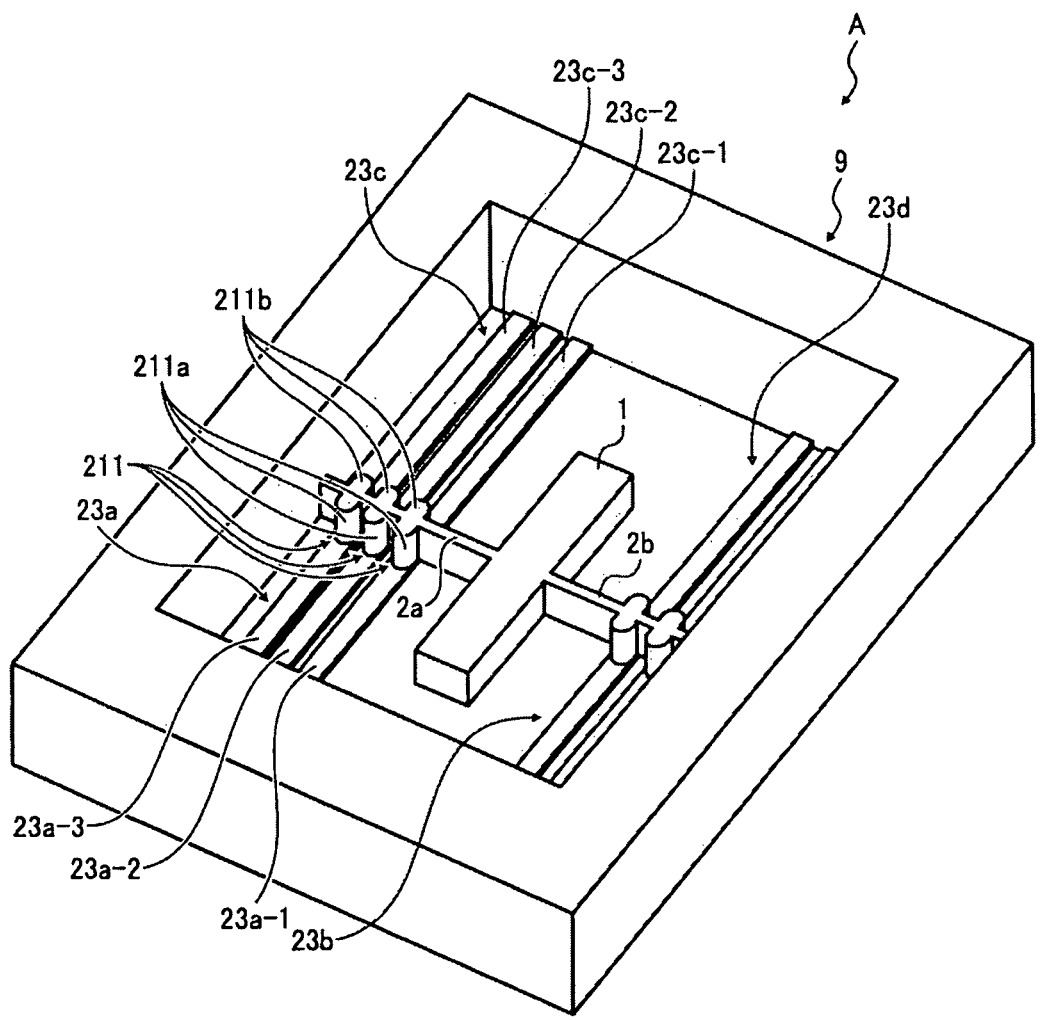
FIG. 2 is a perspective view showing the optical deflector A according to the first embodiment that is depicted in FIG. 1 from an underside direction.

FIGS. 1 to 3 illustrate an optical deflector according to a first embodiment of the present invention.

Conceptually, an optical deflector A according to the first embodiment includes a movable plate 1 that is capable of reflecting a light, a pair of torsion bars 2a and 2b, one end of which is anchored to the movable or reflecting plate 1, another end of which is anchored to a support body 9, and which provides axial support that allows the movable plate 1 to oscillate in a rotational manner, a plurality of oscillating plates 23a to 23d, and a plurality of piezoelectric actuators 28a to 28d, and comprises a plurality of piezoelectric actuators 210a to 210d that causes the movable plate 1 to oscillate in the rotational manner. Each of the oscillating plates 23a to 23d is connected at one end to both sides of each of the pair of torsion bars 2a and 2b, and is connected at another end to opposite sides of the support body 9, such that the oscillating plates 23a to 23d, the movable plate 1, the pair of torsion bars 2a and 2b, and the support body 9 are formed into a single structure, and the piezoelectric unimorph oscillating bodies 210a to 210d comprise a plurality of the oscillating plates 23a-1 to 23a-3, 23b-1 to 23b-3, 23c-1 to 23c-3, and 23d-1 to 23d-3, and a plurality of the piezoelectric actuators 28a-1 to 28a-3, 28b-1 to 28b-3, 28c-1 to 28c-3, and 28d-1 to 28d-3, respectively.

Turning to a further detailed description of the optical deflector A according to the first embodiment, the optical deflector comprises the support body 9, a reflecting plate, i.e., the movable plate, 1, a flexible support unit, i.e., the torsion bars 2a and 2b, and the piezoelectric unimorph oscillating bodies 210a, 210b, 210c, and 210d, wherein a rotational torque that is generated by the piezoelectric unimorph oscillating bodies 210a, 210b, 210c, and 210d is transmitted to the reflecting plate 1 by way of the flexible support units 2a and 2b.

The support body 9 supports the reflecting plate 1 so as to be capable of rotating within a prescribed angle of displacement, and the support body 9 is accordingly formed in a rectangular framework wherein a pair of vertical frame pieces 9c and 9c and a pair of horizontal frame pieces 9d and 9d enclose a rectangular vacant space 9b.

Within a central portion of the rectangular vacant space 9b, the reflecting plate 1 is flexibly supported by the pair of flexible support units 2a and 2b, so as to be capable of rotating within the prescribed angle of displacement, centering around the flexible support units 2a and 2b.

Put another way, each of the flexible support units 2a and 2b is formed in a prismatic shaped cross-section of a rectangle, each respective flexible support unit 2a and 2b is positioned on a common axis, one end of each respective flexible support unit 2a and 2b is formed so as to make a single structure with a center of a lengthwise direction of the vertical frame unit 9c and 9c of the support body 9, and another end of each respective flexible support unit 2a and 2b is formed so as to make a single structure with the reflecting plate 1, at a center of gravity position of the reflecting plate 1. The width W of the respective flexible support unit 2a and 2b is set so as to be sufficiently distorted that the reflecting plate 1 is capable of rotating within the prescribed angle of displacement.

Accordingly, the reflecting plate 1 is capable of including up to the prescribed angle of displacement, treating the flexible support units 2a and 2b as an axis of rotation thereof.

Each respective flexible support unit 2a and 2b is linked to the horizontal frame unit 9d and 9d of the support body 9, by way of a pair of the piezoelectric unimorph oscillating bodies 210a and 210c, and a pair of the piezoelectric unimorph oscillating bodies 210b and 210d.

The pair of the piezoelectric unimorph oscillating bodies 210a and 210c is positioned in opposition to one another so as to sandwich the flexible support unit 2a therebetween, and the pair of the piezoelectric unimorph oscillating bodies 210b and 210d is positioned in opposition to one another so as to sandwich the flexible support unit 2b therebetween.

Furthermore, the piezoelectric unimorph oscillating body 210a and the piezoelectric unimorph oscillating body 210b are positioned in opposition to one another centering on the reflecting plate 1 and in line with a direction of the flexible support units 2a and 2b, and the piezoelectric unimorph oscillating body 210c and the piezoelectric unimorph oscillating body 210d are positioned in opposition to one another centering on the reflecting plate 1 and in line with a direction of the flexible support units 2a and 2b.

Each respective piezoelectric unimorph oscillating body 210a, 210b, 210c, and 210d is respectively connected at one end to the flexible support unit 2a and 2b, and comprises, at another end, an oscillating plate 23a, 23b, 23c, and 23d, which is connected to the horizontal frame unit 9d of the support body 9, and the piezoelectric actuators 28a, 28b, 28c, and 28d, which cause each respective oscillating plate 23a to 23d to oscillate.

According to the first embodiment, each respective oscillating plate 23a to 23d comprises three parallel oscillating plates 23a-1, 23a-2, 23a-3, 23b-1, 23b-2, 23b-3, 23c-1, 23c-2, 23c-3, 23d-1, 23d-2, and 23d-3, which are each respectively separated in a lengthwise direction of the flexible support units 2a and 2b. As per the depiction in the drawing, each respective parallel oscillating plate 23a-1 to 23a-3, 23b-1 to 23b-3, 23c-1 to 23c-3, and 23d-1 to 23d-3 is formed in a rectangular form, wherein a lengthwise side thereof is a side that is in a direct vertical line from a side of each of the flexible support units 2a and 2b.

In similar fashion, each respective piezoelectric actuator 28a, 28b, 28c, and 28d, is respectively built upon or over each respective parallel oscillating plate 23a-1 to 23a-3, 23b-1 to 23b-3, 23c-1 to 23c-3, and 23d-1 to 23d-3, respectively, in order to facilitate oscillation on the part of each respective parallel oscillating plate 23a-1 to 23a-3, 23b-1 to 23b-3, 23c-1 to 23c-3, and 23d-1 to 23d-3, and each respective piezoelectric actuator 28a, 28b, 28c, and 28d, is respectively configured of three parallel actuators 28a-1, 28a-2, 28a-3, 28b-1, 28b-2, 28-b3, 28c-1, 28c-2, 28c-3, 28d-1, 28d-2, and 28d-3, which are separated in the lengthwise direction of the flexible support units 2a and 2b. The parallel actuators 28a-1 to 28a-3, 28b-1 to 28b-3, 28c-1 to 28c-3, and 28d-1 to 28d-3 are respectively formed in a rectangular form, wherein a lengthwise side thereof is a side that is in a direct vertical line from a side of the flexible support unit 2a and 2b, in a manner similar to the parallel oscillating plate 23a-1 to 23a-3, 23b-1 to 23b-3, 23c-1 to 23c-3, and 23d-1 to 23d-3.

A thickness of each respective parallel oscillating plate 23a-1 to 23a-3, 23b-1 to 23b-3, 23c-1 to 23c-3, and 23d-1 to 23d-3, of each respective oscillating plate 23a, 23b, 23c, and 23d, is formed so as to be thinner than a thickness of both the reflecting plate 1 and the flexible support unit 2a and 2b, and the durability thereof is also formed so as to be lower than a durability of both the reflecting plate 1 and the flexible support unit 2a and 2b.

Furthermore, as shown in FIG. 2, a linking unit 211 is present between the flexible support unit 2a and 2b and the pair of respective parallel oscillating plate 23a-1 to 23a-3, 23b-1 to 23b-3, 23c-1 to 23c-3, and 23d-1 to 23d-3, which are positioned so as to sandwich the flexible support unit 2a and 2b therebetween, wherein a protrusion unit 211b is formed in the linking unit 211, wherein the protrusion unit 211b includes an elliptically shaped surface 221a, which is enlarged in a semi-elliptical form from a surface of the flexible support unit 2a and 2b, thereby increasing a surface area of a conjoining of the flexible support unit 2a and 2b with each respective parallel oscillating plate 23a-1 to 23a-3, 23b-1 to 23b-3, 23c-1 to 23c-3, and 23d-1 to 23d-3.

It is to be understood that the reflecting plate 1, the flexible support unit 2a and 2b, the oscillating plate 23a, 23b, 23c, and 23d, and the protrusion unit 211b, are formed into a single structure within a cuboid single crystal silicon substrate, by performing a removal processing upon an excess or otherwise unnecessary part of the support body 9, thus making it possible to improve a precision in an alignment of each respective configuration element as compared with such a process technique as conjoining each respective configuration element or using an adhesive substance to attach each respective configuration element to each other respective configuration element, and a detailed description of a sequence of manufacturing thereby will accordingly be provided hereinafter.

The piezoelectric actuator 28a to 28d is configured, respectively, of an upper part electrode 25a, 25b, 25, and 25d, a voltage film 26a, 26b, 26c, and 26d, and a lower part electrode 27a, 27b, 27c, and 27d, in a layered structure.

With regard to each respective piezoelectric actuator 28a to 28d, applying a prescribed voltage to the upper part electrode 25a, 25b, 25, and 25d, and to the lower part electrode 27a, 27b, 27c, and 27d, respectively, drives each respective piezoelectric actuator 28a, 28b, 28c, and 28d, whereupon each respective parallel oscillating plate 23a-1 to 23a-3, 23b-1 to 23b-3, 23c-1 to 23c-3, and 23d-1 to 23d-3 of each respective oscillating plate 23a, 23b, 23c, and 23d oscillates in a unimorph manner, treating an end thereof that is connected to the support body 9 and the pair of flexible support unit 2a and 2b as a fulcrum.

It should be understood that a differing phase alternating current is applied when each respective piezoelectric actuator 28a, 28b, 28c, and 28d, is driven; more specifically, two alternating currents are applied thereupon, differing in phase by 180 degrees from one another.

Prior to the removal process of the silicon substrate, a film of the piezoelectric actuator 28a, 28b, 28c, and 28d, is directly formed upon or over the support body 9 by way of a technique such as Chemical Solution Deposition (CSD), and Metal Organic Chemical Vapor Deposition (MOCVD), sputtering, or reactive ion plating, and is formed by a patterning process through either wet or dry etching. Specifically, it is presumed that a voltage film is formed by an ion plating technique that uses an arc discharge plasma.

Following is a description of a sequence of manufacturing the optical deflector A according to the first embodiment. Whereas the piezoelectric unimorph oscillating body 210a and 210b, of each respective piezoelectric unimorph oscillating body 210a to 210d, that is on one side of the flexible support unit 2a and 2b, is depicted in FIG. 3, it is to be understood that the piezoelectric unimorph oscillating body 210c and 210d, that is on another side of the flexible support unit 2a and 2b, is similar thereto.

According to the first embodiment, a laminated substrate, i.e. a silicon-on-insulator (SOI) substrate, with a total thickness of 552 μm, is employed as the support body 9, with a top layer of single crystal silicon, a middle oxide film layer of silicon dioxide (Sio2), and a base layer of single crystal silicon. Each layer has a respective thickness of 25 μm, 2 μm, and 525 μm, and an optical polishing process is carried out on an upper surface of the top layer.

As depicted in FIG. 3 A, a thermal silicon dioxide film of between 500 mn and 1000 nm in thickness is formed on the upper surface of the SOI substrate by way of a diffusion furnace.

As depicted in FIG. 3 B, a film of titanium (Ti) with a 50 nm thickness and a film of platinum (Pt) with a 150 nm thickness are formed one after another on the top layer, i.e., on the upper surface of the substrate, by way of the sputtering technique, thus forming a lower part electrode 7.

A reactive arc discharge ion plating technique (refer, e.g., to Japanese Patent Laid Open No. 2001-234331, Japanese Patent Laid Open No. 2002-177765, and Japanese Patent Laid Open No. 2003-81694) is used to form a film of lead zirconate titanate (PZT) with a 3?m thickness, which is a voltage material, upon or over an upper part electrode 5, thus forming a voltage film 6.

Thereafter, the sputtering technique is used to form a film of platinum (Pt) with a 150 nm thickness upon or over the piezoelectric film 6.

As depicted in FIG. 3 C, a photolithography technology and a dry etching technology are used to perform a patterning on the upper surface of the substrate of the upper part electrode 5, the piezoelectric film 6, and the lower part film 7, thereby creating each respective parallel actuator 28a-1 to 28a-3 and 28b-1 to 28b-3 of each respective piezoelectric actuator 28a and 28b.

In such a circumstance, the platinum Pt and titanium Ti layer of the lower part electrode 7 of the reflecting plate 1 is protected with a resist from the dry etching, and is thus preserved as a reflecting film. When increasing an efficiency of light reflection of the reflecting plate 1 is desired, a formation of a reflecting film is performed thereafter upon or over the platinum Pt of the reflecting plate 1, using the photolithography technology and the dry etching technology upon a film of aluminum (Al) or gold (Au) that is formed with the sputtering technique.

As depicted in FIG. 3 D, the overall upper surface of the substrate is protected with a thick resist film, and, after the thermal oxide film of the under surface of the lower base level is removed with buffered hydrofluoric acid (BHF), an aluminum layer is formed using the sputtering technique, a patterning is performed thereupon with the photolithography technology and the wet etching technology, thus forming an Inductive Coupled Plasma Reactive Ion Etching (ICP-RIE) hard mask.

Thereafter, as shown in FIG. 3 E, the protective resist is detached from the upper surface, the photolithography technology is performed once more to make a mask of the resist pattern, the thermal oxide film and the single crystal silicon of the top layer are removed, in an ICP-RIE device, by the dry etching, leaving the reflecting plate 1, the flexible support unit 2a and 2b, and the oscillating plates 23a and 23b (or 23c and 23d), and finally forming a cavity that becomes the vacant space 9b of the support body 9.

As shown in FIG. 3 F, the dry etching process is performed by the ICP-RIE device on the single crystal silicon of the base layer of the under surface thereof, forming the cavity that becomes the vacant space 9b of the support body 9.

Finally, as depicted in FIG. 3 G, the middle oxide film layer is removed with the buffered hydrofluoric acid (BHF), forming the vacant space 9b of the support body 9, and thus, completing the optical deflector A that is depicted in FIG. 1.

Following is a description of an operation of the optical deflector A according to the first embodiment.

An alternating current, e.g., a sinusoidal current, is applied in phase to each of the piezoelectric unimorph oscillating bodies 210a and 210b, which are sandwiching the flexible support bodies 2a and 2b on one side thereof, and to the piezoelectric unimorph oscillating bodies 210c and 210d, which are sandwiching the flexible support bodies 2a and 2b on another side thereof, in either an inverse phase or out of phase, thus causing the oscillating plates 23a and 23b, and the oscillating plates 23c and 23d, to oscillate.

A base end of each respective oscillating plate 23a, 23b, 23c, and 23d, is anchored as a single structure with the support body 9, and a lead end unit of a side of the flexible support body 2a and 2b, which is another end of each respective oscillating plate 23a, 23b, 23c, and 23d, oscillates in a vertical direction, as a free terminal.

Varying the phase of the piezoelectric unimorph oscillating bodies 210a and 210b, and the phase of the piezoelectric unimorph oscillating body 210c and 210d, causes a phase difference to arise in the oscillation of the oscillating plates 23a and 23b, which are linked to the flexible support unit 2a, and in the oscillation of the oscillating plates 23c and 23d, which are linked to the flexible support unit 2b. In particular, when the voltage thus applied is the inverse phase or out of phase, the direction of the oscillation of the lead end unit becomes the opposite. Put another way, when a lead end unit of the oscillating plates 23a and 23b on the side of each of the flexible support units 2a and 2b moves in an upward direction, a lead end unit of each of the oscillating plates 23c and 23d on the side of each flexible support unit 2a and 2b moves in a downward direction.

In such a circumstance, a rotational torque, which is centered on the flexible support unit 2a and 2b, acts on the reflecting plate 1, causing the reflecting plate 1 to incline around a center axis of the flexible support unit 2a and 2b. A repeated vertical oscillation of each respective lead end unit of each respective oscillating plate 23a, 23b, 23c, and 23d, in response to the alternating current applied thereto, causes the rotational torque to act on the reflecting plate 1 in a see-saw manner, according to the preceding theory, and thus, the reflecting plate 1 repeatedly oscillates in a rotational manner until it reaches a prescribed angle. The reflecting plate 1 oscillates in a rotational manner that is similar to the preceding, even with regard to an oscillation when the phase of the voltage thus applied is in the phase difference, rather than in the inverse phase.

As an example thereof, a trial was performed wherein a voltage of 20V pp in phase, with a sinusoidal bias of 3.2 kHz, was applied to the piezoelectric actuator 28a and 28b of the piezoelectric unimorph oscillating body 210a and 210b, and a like voltage of 20V pp in inverse phase, with a sinusoidal bias of 3.2 kHz, was applied to the piezoelectric actuator 28c and 28d of the piezoelectric unimorph oscillating body 210c and 210d, in an attempt to cause the reflecting plate 1 to oscillate in a rotational manner. A helium neon (He—Ne) laser light was projected on to the reflecting plate 1, a light reflected therefrom was observed on a screen that is positioned at a prescribed distance, and when an angle of rotation of the reflecting plate 1 was measured, an angle of rotation of plus or minus 23 degrees was obtained. In such a circumstance, when an optical scan that was deflected by the reflecting plate 1 was observed over time, a stable light scan that had a good linearity control was found. The angle of rotation was found to be on the order of plus or minus 10 degrees, in a circumstance wherein the oscillating plate and the piezoelectric actuator of each respective piezoelectric unimorph oscillating body 210a, 210b, 210c, and 210d were treated as a single structure.

The reason for the preceding result is that the oscillating plate 23a, 23b, 23c, and 23d of a single piezoelectric unimorph 210a, 210b, 210c, and 210d respectively comprise three parallel oscillating plates 23a-1 to 23a-3, 23b-1 to 23b-3, 23c-1 to 23c-3, and 23d-1 to 23d-3, and three parallel actuators 28a-1 to 28a-3, 28b-1 to 28b-3, 28c-1 to 28c-3, and 28d-1 to 28d-3, and a force that is generated by the piezoelectric unimorph oscillating body 210a to 210d is greater than a force that is generated by a conventional configuration of a single piezoelectric unimorph oscillating body as a single oscillation plate and a single piezoelectric actuator, and thus, the rotational torque that acts upon the flexible support unit 2a and 2b is increased.

In the present circumstance, when a driving frequency of the piezoelectric unimorph oscillating body 210a, 210b, 210c, and 21d is identical with or close to a mechanical resonance frequency of an assembly that brings together the reflecting plate 1 and the flexible support unit 2a and 2b, i.e., a movable mirror unit, the rotational oscillation of the reflecting plate 1 reaches its maximum, and a maximum angle of displacement can be obtained thereby.

Setting the resonance frequency of the oscillating plate 23a, 23b, 23c, and 23d to be either identical with or close to the resonance frequency of the movable mirror unit makes it possible to obtain a large angle of rotation of the movable mirror unit, even when the driving force of the piezoelectric actuator 28a, 28b, 28c, and 28d is small. It is to be understood that it is possible to cause the reflecting plate 1 to oscillate in the rotational manner at the drive frequency of the piezoelectric actuator 28a, 28b, 28c, and 28d, even if the angle of rotation becomes small.

Furthermore, given that the reflecting plate 1 oscillates in the rotational manner with the flexible support unit 2a and 2b, which are linked to the reflecting plate 1 at a center of gravity thereof, being treated as an axis of rotation thereof, it is thus possible to keep a translational motion under control.

When the lead end unit of each respective oscillating plate 23a, 23b, 23c, and 23d oscillates in the vertical direction, and the force is transmitted to the flexible support unit 2a and 2b that are linked thereto, a shearing acts upon the linking unit 211 in the same direction as the direction of the oscillation. Consequently, a problem arises in that, when the linking unit 211 lacks sufficient structural strength, or when a stress that results from the shearing is concentrated in a portion of the linking unit 211, the component may break.

In response thereto, according to the first embodiment, the protrusion unit 211b is formed in each respective linking unit 211 for each respective parallel oscillating plate 23a-1 to 23a-3, 23b-1 to 23b-3, 23c-1 to 23c-3, and 23d-1 to 23d-3, of each respective oscillating plate 23a, 23b, 23c, and 23d, with regard to the flexible support unit 2a and 2b, thus keeping an occurrence of a breakage within the linking unit 211 under control by dispersing the shearing that arises within the linking unit 211, and keeping the concentration of the stress in a single portion thereof under control.

With regard to the optical deflector A according to the first embodiment, it was found that, by aligning the driving frequency of the piezoelectric unimorph oscillating body 210a, 210b, 210c, and 210d with the mechanical resonance frequency of the reflecting plate 1, including the flexible support unit 2a and 2b, it was possible to obtain a large angle of rotation even with a low voltage driving force.

Given that the optical deflector A according to the first embodiment is an assembly that separates a point of effect of the rotational torque of the piezoelectric unimorph oscillating body 210a, 210b, 210c, and 210d from the reflecting plate 1, it was found that only a rotational movement, which treated the flexible support unit 2a and 2b as a center axis thereof, was driven with regard to the reflecting plate 1, thus allowing a stable optical scan to be performed.

As per the preceding description, it is possible to obtain the following effects with regard to the optical deflector A according to the first embodiment:

1. Forming the support body 9, the oscillating plate 23a, 23b, 23c, and 23d, the flexible support unit 2a and 2b, and the reflecting plate 1 into a single structure makes using a conjoining or adhesive operation unnecessary, thus simplifying the manufacture of the optical deflector A according to the first embodiment.

2. Using a voltage film that is formed directly within the support body 9 as the piezoelectric actuator 28a to 28d allows an integrated processing on a per silicon wafer basis, which also simplifies the manufacture of the optical deflector A according to the first embodiment.

3. The preceding items 1. and 2. facilitate miniaturization, reduced thickness, and reduced weight and mass of the optical deflector A according to the first embodiment.

4. The miniaturization of the piezoelectric actuator 28a to 28d allows the optical deflector A according to the first embodiment to operate at a higher speed, and to obtain a larger angle of deflection, than a conventional device.

Furthermore, the protrusion unit 211b is formed in each respective linking unit 211 for each respective parallel oscillating plate 23a-1 to 23a-3, 23b-1 to 23b-3, 23c-1 to 23c-3, and 23d-1 to 23d-3, of each respective oscillating plate 23a, 23b, 23c, and 23d, with regard to the flexible support unit 2a and 2b, thus keeping an occurrence of a breakage within the linking unit 211 under control by dispersing the shearing that arises within the linking unit 211, and keeping the concentration of the stress in a single portion thereof under control. Consequently, it is possible to increase a durability of the linking unit and make the angle of deflection large, thus facilitating an achievement of an operation at an ever higher speed, as well as an ever greater angle of deflection.

5. Enabling each respective oscillating plate 23a, 23b, 23c, and 23d to be driven directly by the piezoelectric actuator 28a to 28d allows the optical deflector A according to the first embodiment to operate even in a dissonance mode.

6. Given that each respective piezoelectric unimorph oscillating body 210a, 210b, 210c, and 210d is of a configuration that respectively comprises the three parallel oscillating plates 23a-1 to 23a-3, 23b-1 to 23b-3, 23c-1 to 23c-3, and 23d-1 to 23d-3, and the three parallel actuators 28a-1 to 28a-3, 28b-1 to 28b-3, 28c-1 to 28c-3, and 28d-1 to 28d-3, the force that the piezoelectric unimorph oscillating body 210a to 210d is capable of generating is greater than the force that a conventional single piezoelectric unimorph oscillating body is capable of generating, which, in turn, increases the torque that acts on the flexible support unit 2a and 2b. Accordingly, it is possible to magnify the torque with regard to the flexible support unit 2a and 2b, thus facilitating acquiring a greater angle of deflection on the part of the reflecting plate 1.

Second Embodiment

Figure 4:
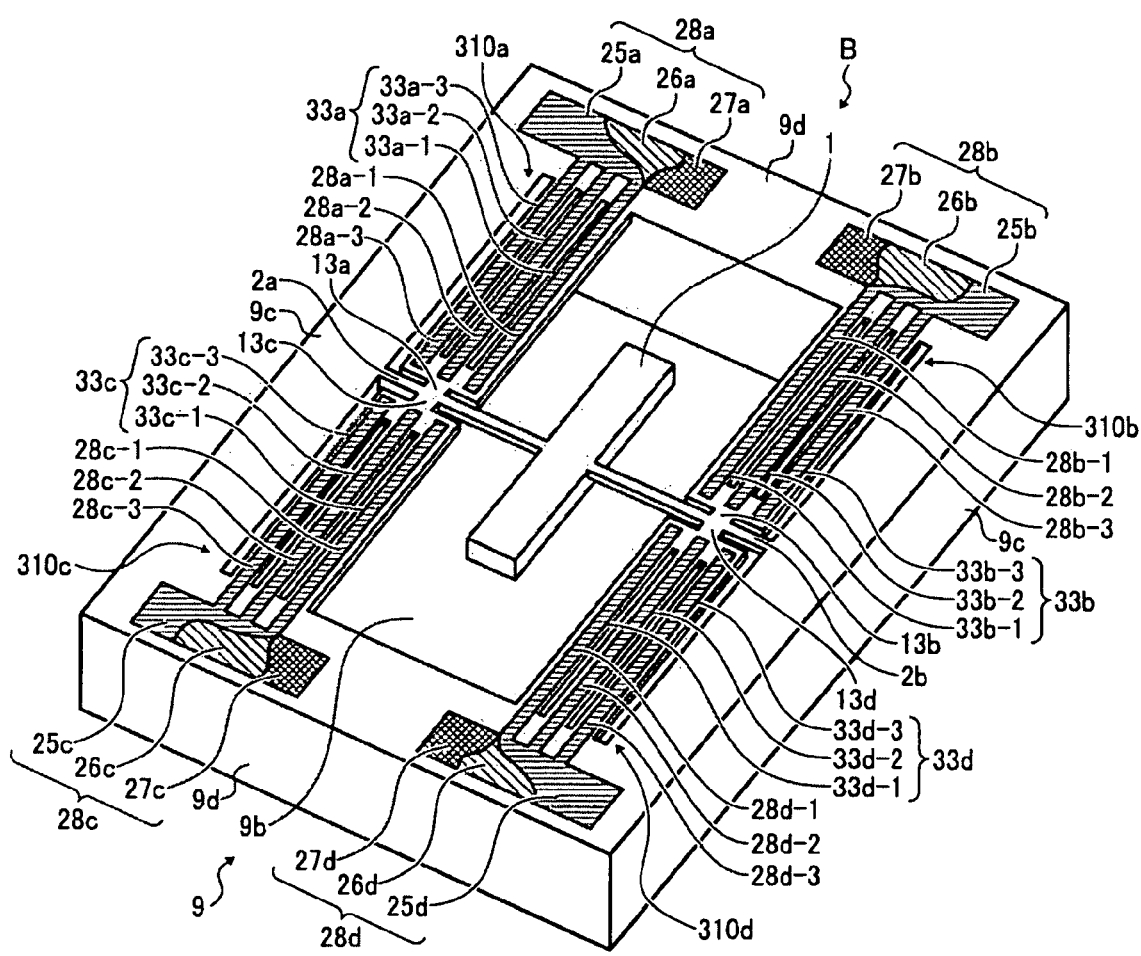
FIG. 4 is a perspective view showing an optical deflector B according to a second embodiment of the present invention.

Following is a description of an optical deflector B according to a second embodiment of the present invention, with reference to FIG. 4. As the second embodiment is a variant embodiment of the first embodiment, only the differences between the second embodiment and the first embodiment will be described, a configuration that is the same as, or equivalent to, a configuration according to the first embodiment will be marked with an identical reference numeral, and a description thereof omitted, and a description will be further omitted pertaining to an operating effect that is identical to the operating effect according to the first embodiment.

The optical deflector B according to the second embodiment differs from the first embodiment in the configuration of a piezoelectric unimorph oscillating body 310a, 310b, 310c, and 310d, such as is shown in FIG. 4.

Similar to the first embodiment, the piezoelectric unimorph oscillating body 310a, 310b, 310c, and 310d respectively comprise an oscillating plate 33a, 33b, 33c, and 33c, which, in turn, respectively comprise three parallel oscillating plates 33a-1, 33a-2, 33a-3, 33b-1, 33b-2, 33b-3, 33c-1, 33c-2, 33c-3, 33d-1, 33d-2, and 33d-3. The respective parallel oscillating plates 33a-1 to 33a-3, 33b-1 to 33b-3, 33c-1 to 33c-3, and 33d-1 to 33d-3, of each respective oscillating plate 33a, 33b, 33c, and 33, are conjoined respectively to a single conjoining unit 13a, 13b, 13c, and 13d, and thus linked in turn to each respective flexible support unit 2a and 2b.

As a result thereof, it becomes possible to set the position, with regard to each respective oscillating plate of the piezoelectric unimorph type oscillating plate 33a, 33b, 33c, and 33d, which is linked to the flexible support unit 2a and 2b, and which transmits the torque from the oscillating plate 33a, 33b, 33c, and 33d to the flexible support unit 2a and 2b, in an optimal position that takes into account the resonance frequency, even if each of the parallel oscillating plates 33a-1 to 33a-3, 33b-1 to 33b-3, 33c-1 to 33c-3, and 33d-1 to 33d-3, is increased in number, and it becomes possible to easily increase the torque that is communicated to the flexible support unit 2a and 2b, and to acquire a large angle of deflection, with a simple drive operation, by driving the plurality of the oscillating plates 33a-1, 33a-2, 33a-3, 33b-1, 33b-2, 33b-3, 33c-1, 33c-2, 33c-3, 33d-1, 33d-2, and 33d-3, which are connected to the selfsame conjoining unit 13a, 13b, 13c, and 13d. Thus, according to the second embodiment, the resonance frequency of the oscillating plate 33a, 33b, 33c, and 33d, is set to be either the same as, or close to, the resonating frequency of the reflecting plate 1.

It should be understood that the piezoelectric actuators 28a, 28b, 28c, and 28d that are employed according to the second embodiment are similar to the piezoelectric actuators 28a, 28b, 28c, and 28d that are depicted according to the first embodiment.

With regard to the optical deflector B according to the second embodiment that is described according to the preceding, a trial of a rotational oscillation of the reflecting plate 1 was conducted, similar to the trial that was conducted according to the first embodiment, by applying a sinusoid voltage in phase to the piezoelectric actuators 28a and 28b, and out of phase to the piezoelectric actuators 28c and 28d. The voltage in the present instance was 20 Vpp, 3 kHz.

In such a circumstance, when the angle of rotation of the movable or reflecting plate 1 was measured, as per the first embodiment, the angle of rotation that was obtained was plus or minus 27 degrees, a greater angle of rotation than was obtained according to the first embodiment. The reason is that the oscillating plates 33a, 33b, 33c, and 33d respectively comprise the three parallel oscillating plates 33a-1 to 83a-3, 33b-1 to 33b-3, 33c-1 to 33c-3, and 33d-1 to 33d-3, thus making it possible to obtain a high degree of rotational torque, as with the first embodiment, as well as to transmit the torque that is generated by the plurality of the piezoelectric actuators 28a-1 to 28a-3, 28b-1 to 28b-3, 28c-1 to 28c-3, and 28d-1 to 28d-3, respectively, in a concentrated manner from each respective conjoining unit 13a to 13d to a single location, i.e., the flexible support units 2a and 2b.

Given that the piezoelectric actuators 28a to 28d and the flexible support units 2a and 2b are linked via the conjoining units 13a to 13d, it is a simple matter to calculate an effective spring constant of the flexible support units 2a and 2b, and it is a simple matter to design the resonance frequency.

Accordingly, it has been verified with regard to the optical deflector B according to the second embodiment that aligning the driving frequency of the piezoelectric actuator 28a to 28d with the mechanical resonance frequency of the reflecting plate 1, which includes the flexible support unit 2a and 2b, facilitates obtaining a large angle of rotation even with a low voltage drive. It was further determined that it was possible thereby to perform a stable optical scan, in a manner similar to the first embodiment.

It is possible to apply an optical device that comprises the optical deflector A and B according to the first and second embodiment to an optical scanning device that forms an image on a photosensitive body, i.e., an optical scanner, such as an electrophotographic copier or a laser printer, or to an optical scanning device of a bar code reader.

Accordingly, it is possible to provide an optical device that comprises the optical deflector A or B, wherein a high speed operation is possible, a large angle of deflection and a large amplitude operation may be obtained, and it is possible to achieve a miniaturization, a reduced thickness, and a reduced mass and weight thereof.

Third Embodiment

Figure 5:
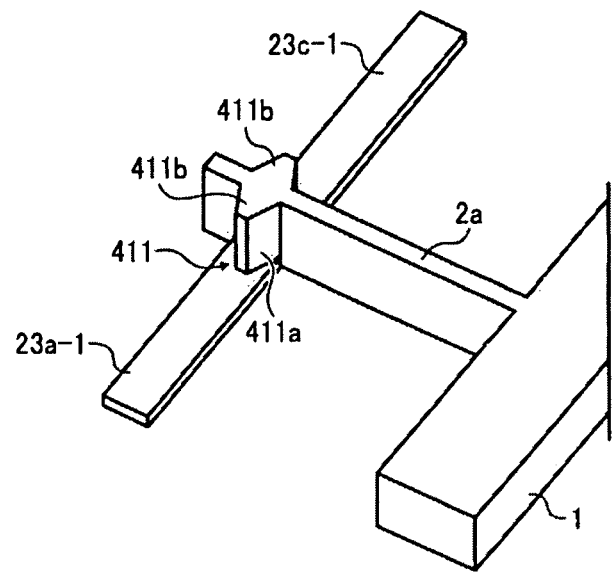
FIG. 5 is a perspective view showing a core element of an optical deflector according to a third embodiment.

Following is a description of an optical deflector according to a third embodiment of the present invention, with reference to FIG. 5. As the third embodiment is a variant embodiment of the first embodiment, only the differences between the third embodiment and the first embodiment will be described, a configuration that is the same as, or equivalent to, a configuration according to the first embodiment will be marked with an identical reference numeral, and a description thereof omitted, and a description will be further omitted pertaining to an operating effect that is identical to the operating effect according to the first embodiment.

A linking unit 411 according to the third embodiment, as depicted in FIG. 5, differs from the linking unit 211 according to the first embodiment. It should be understood that only a representative linking unit 411 that links the flexible support unit 2a with the parallel oscillating plate 23a-1 and 23c-1 is depicted from among a plurality of the linking unit 411 according to the third embodiment, and a depiction of another linking unit 411 is omitted herein.

A protrusion unit 411b of the linking unit 411 is formed such that a horizontal cross section thereof is formed in an approximate pyramidal form, and a side surface 411a is formed of three surfaces.

According to the third embodiment, and as per the foregoing embodiments, the protrusion unit 411b is formed in the linking unit 411, thus keeping an occurrence of a breakage within the linking unit 411 under control by dispersing the shearing that arises within the linking unit 411, and keeping the concentration of the stress in a single portion thereof under control.

Fourth Embodiment

Figure 6:
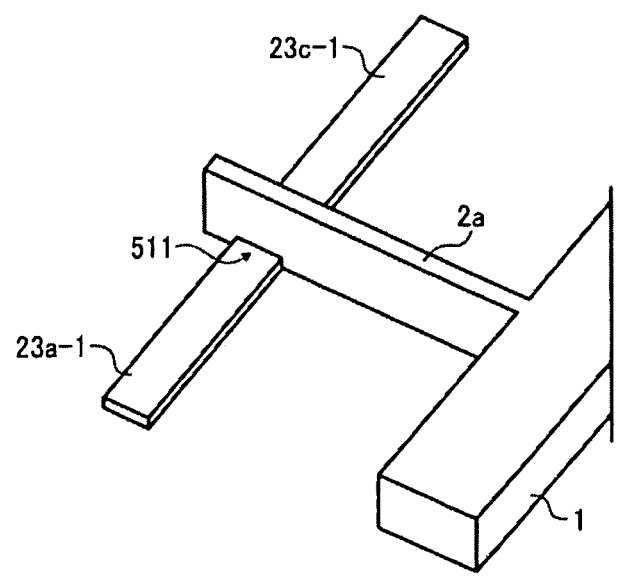
FIG. 6 is a perspective view showing a core element of an optical deflector according to a fourth embodiment.
Figure 7:
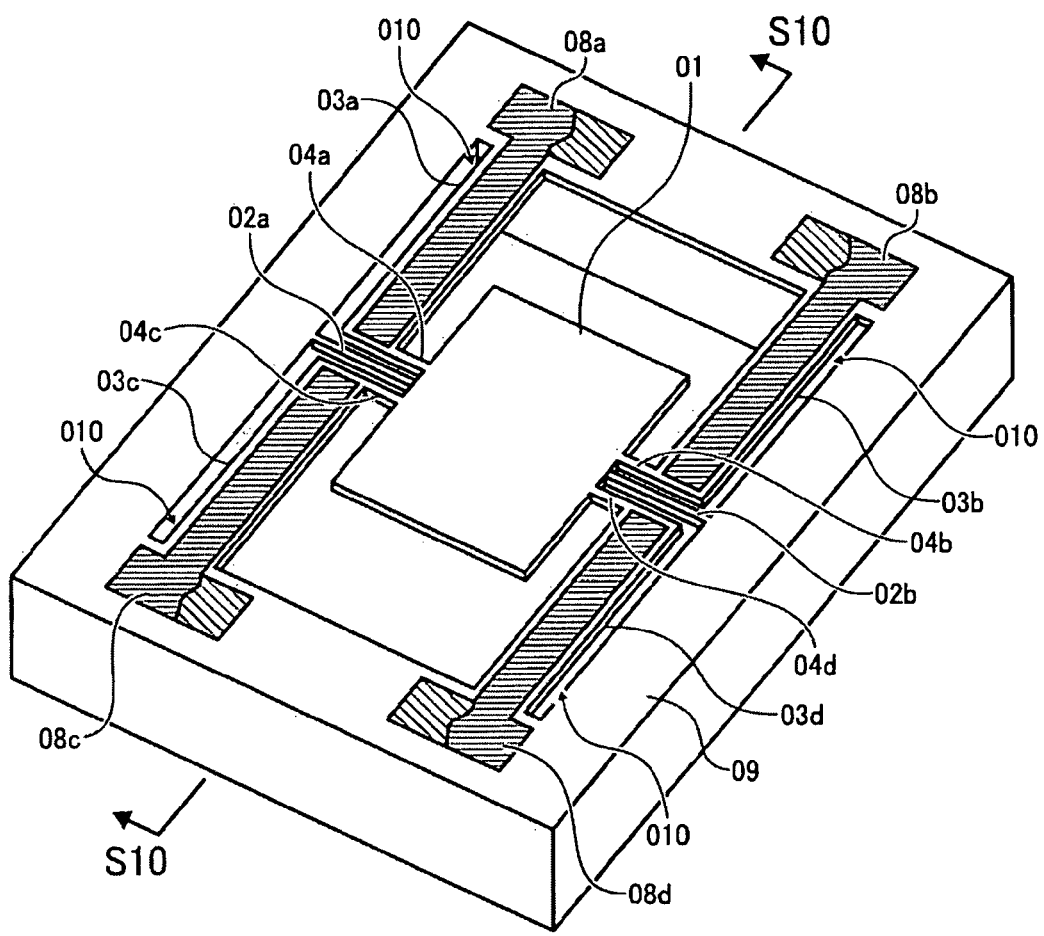
FIG. 7 is a perspective view showing a conventional optical deflector.
Figure 8:
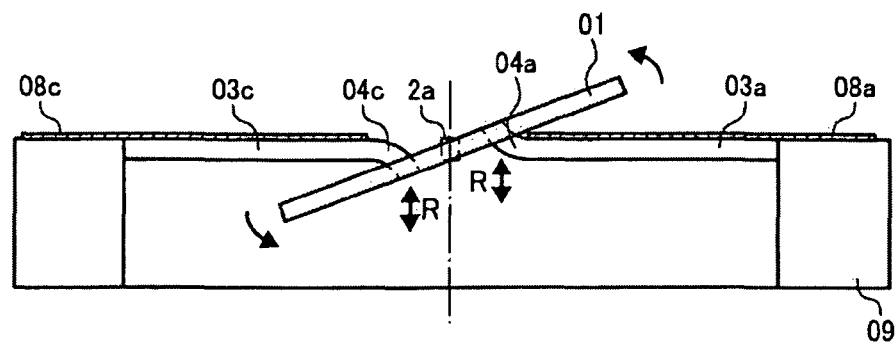
FIG. 8 is a view explaining an operation of the conventional optical deflector.
Figure 9:
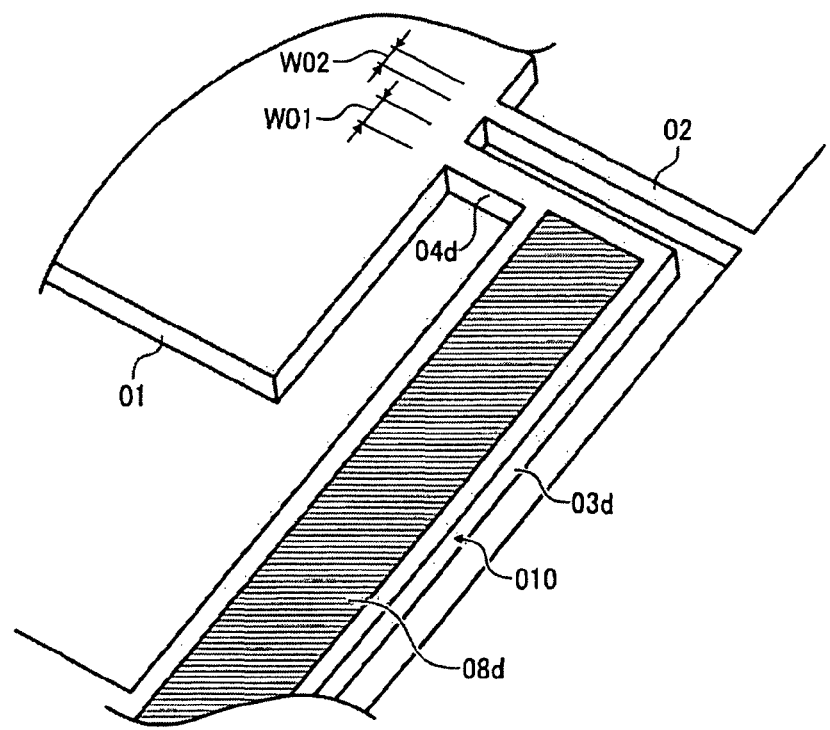
FIG. 9 is an enlarged view of a main part of the conventional optical deflector.
Figure 10:
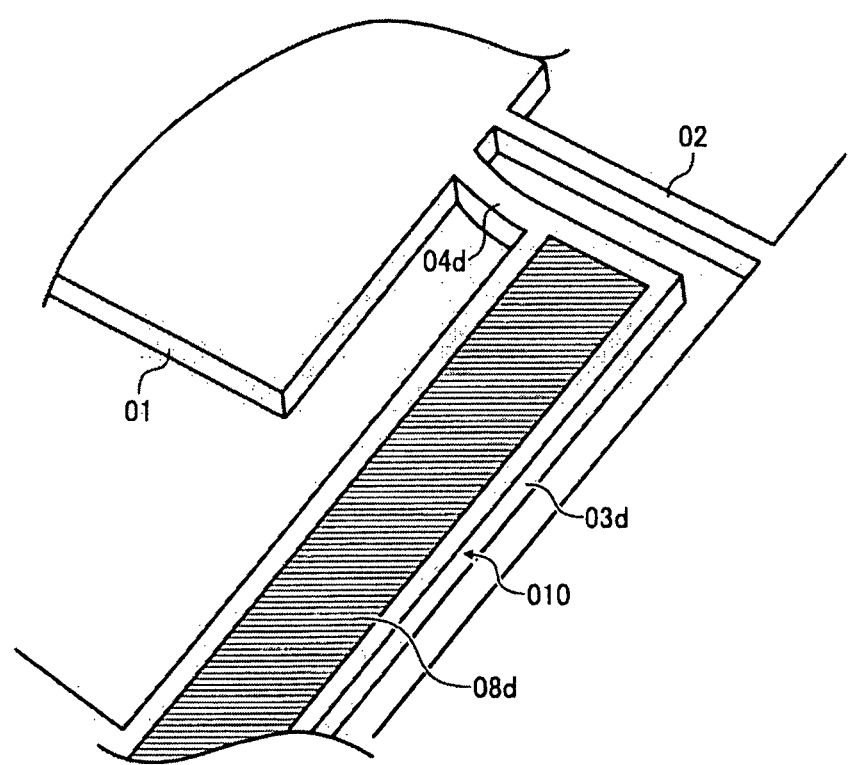
FIG. 10 is an enlarged view of a main part of the conventional optical deflector.

Following is a description of an optical deflector according to a fourth embodiment of the present invention, with reference to FIG. 6. As the fourth embodiment is a variant embodiment of the first embodiment, only the differences between the fourth embodiment and the first embodiment will be described, a configuration that is the same as, or equivalent to, a configuration according to the first embodiment will be marked with an identical reference numeral, and a description thereof omitted, and a description will be further omitted pertaining to an operating effect that is identical to the operating effect according to the first embodiment.

A linking unit 511 according to the fourth embodiment, as depicted in FIG. 6, differs from the linking unit 211 according to the first embodiment. It should be understood that only a representative linking unit 511 that links the flexible support unit 2a with the parallel oscillating plate 23a-1 and 23c-1 is depicted from among a plurality of the linking unit 511 according to the fourth embodiment, and a depiction of another linking unit 511 is omitted herein.

According to the fourth embodiment, an example is depicted wherein a protrusion unit is eliminated with regard to the linking unit 511, and a fixed cross section surface is formed of the flexible support unit 2a.

As per the preceding, with regard to the optical deflector according to the present invention, when the force that is generated by the piezoelectric unimorph oscillating body is transmitted to the direct torsion bar, becoming the torque that causes the torsion bar to rotate, it becomes possible to increase a number of the oscillation body and the piezoelectric actuator on a per piezoelectric unimorph oscillating body basis, to increase the driving power, and to increase the torque that voltage the unimorph oscillating plate applies to the torsion bar, thus facilitating a magnification of the torque that acts on the torsion bar, and an acquisition thereby of a greater angle of deflection.

Furthermore, the torque is transmitted, without being offset or cancelled, from the piezoelectric unimorph oscillating body that sandwiches the torsion bar in an opposition to the piezoelectric unimorph oscillating body on either side of the torsion bar, thus facilitating a generation of a torque from an effectual rotation of the torsion bar, and an acquisition thereby of a larger angle of deflection than is possible with the conventional technology.

The piezoelectric actuator is capable of minimizing a displacement of a direction of an actuator displacement that is necessary to adding the torque to the torsion bar and a displacement of the piezoelectric actuator in an orthogonal direction thereto, thus facilitating an effectual application of the torque upon the torsion bar.

Given that the torque is transmitted, without being offset or cancelled, from the piezoelectric unimorph oscillating body that sandwiches the torsion bar in the opposition to the piezoelectric unimorph oscillating body on either side of the torsion bar, it is thus possible to generate the torque from an effectual rotation of the torsion bar, and to acquire thereby a larger angle of deflection than is possible with the conventional technology.

When manufacturing the piezoelectric actuator over a large surface area in order to generate a large force, it is possible to keep an amount of the displacement in the direction of the generation of the displacement that is necessary for the generation of the torque of the piezoelectric actuator and the direction that is orthogonal thereto, thereby facilitating an effectual application of the torque to the torsion bar.

Given that the protrusion unit is formed on the linking unit of the oscillating plate and the torsion bar, which protrudes externally from the torsion bar and expands the surface area of the contact between the torsion bar and the oscillating plate, it is thus possible to keep the shearing of the contact surface thereof under control by keeping the force per unit surface area that acts on the contact surface when the torque is transmitted from the piezoelectric unimorph oscillating body to the torsion bar and keeping the stress that arises upon the contact surface under control, which facilitates increasing the torque that is communicated to the torsion bar, and acquiring a large angle of deflection.

Furthermore, no angle is present wherein the stress may easily concentrate on the protrusion unit, thus facilitating a further reduction in the stress on the contact surface, and further increasing the torque that is communicated to the torsion bar, and acquiring a larger angle of deflection.

Given that it is possible to transmit the torque that is generated by the plurality of piezoelectric unimorph oscillating body from a single conjoining unit to a single location of the torsion bar, it would be sufficient to drive the plurality of piezoelectric unimorph oscillating body that is connected to the given conjoining unit at the same displacement and phase, thus facilitating, by a simple drive method, easily increasing the torque that is communicated to the torsion bar, and acquiring a larger angle of deflection.

According to the invention disclosed according to claim 11, the oscillating plate may be easily bent, thus causing the torque that is communicated to the torsion bar to increase, and facilitating an acquisition of a larger angle of deflection.

No constituent is present that is extinguished by the torque that is communicated to the torsion bar by the piezoelectric unimorph oscillating body that is present on either side thereof, thus facilitating an effectual transmission of the torque, allowing the torque that is thus communicated to the torsion bar to be easily increased, and a large angle of deflection to be acquired.

It is possible to obtain a larger displacement as compared with a conventional application of voltage through a reversal of polarity, and it is thereby possible to obtain a greater angle of deflection.

Furthermore, all manufacturing may be performed using a semiconductor process, allowing mass production of the optical deflector at an inexpensive cost.

Given that a high performance voltage film can be produced in mass quantity at an inexpensive cost, it will be possible to produce the optical deflector in mass quantity at an inexpensive cost.

Given that a lead zirconate titanate (PZT) composition is close to a morphotropic phase boundary (MPB), the torque that is generated increases, and it is thus possible to acquire a large angle of deflection.

It is possible to obtain a larger displacement as compared with a conventional application of voltage through a reversal of polarity, and it is thereby possible to obtain a greater angle of deflection. It is further possible to provide a high performance, low cost optical device.

It should be understood that the present invention may be applied across a wide range of devices, such as any and all optical devices that deflect and scan a beam of light, such as a laser beam, an electrophotographic copier, a laser beam printer, a bar code reader, a display device that scans a laser light and projects an image, a heads up display for automobiles and consumer electronic devices, a raster scan display for use in cellular phones, a range finder sensor, a shape measurement sensor, or an optical spatial communication unit.

While the first to the fourth embodiments of the present invention have been described herein with reference to the attached drawings, a specific configuration is not restricted to the first to the fourth embodiments or the examples depicted therein, and it is to be understood that a design variation that does not depart from the essential substance of the present invention is included within the present invention.

As an example, while the oscillating plate is depicted according to the first to the fourth embodiments as a shallow rectangular plate structure, the form thereof is not restricted to the form as depicted according to the first to the fourth embodiments, and it would thus be permissible for the form thereof to be such as other than rectangular, or a columnar shape instead of a shallow plate shape.

What is claimed is:

1. An optical deflector, comprising:
   a movable plate configured to reflect light;
   a pair of torsion bars configured to support movably and oscillatably the movable plate, each of the torsion bars having one end anchored to the movable plate and another end anchored to a support body; and
   piezoelectric unimorph oscillating bodies configured to cause the movable plate to rotationally oscillate, the piezoelectric unimorph oscillating bodies including a plurality of parallel oscillating plates and a plurality of piezoelectric actuators configured to drive the oscillating plates, and respective ends of more than one of the piezoelectric actuators that lie within a same plane are joined to a piezoelectric actuator portion fixed to the support body, wherein
   one end of each of the oscillating plates is connected to a respective one of the torsion bar, and another end of each of the oscillating plates is connected to the support body,
   the oscillating plates, the movable plate, the torsion bars, and the support body are formed of a unitary structure,
   at least one pair of piezoelectric unimorph oscillating bodies are installed respectively on both sides of the movable plate,
   the piezoelectric unimorph oscillating bodies include the plurality of oscillating plates which are disposed parallel to each other, and
   each of the oscillating plates includes one of the piezoelectric actuators.

2. The optical deflector according to claim 1, wherein one piezoelectric unimorph oscillating body is positioned in an opposing pair with another piezoelectric unimorph oscillating body, such that each respective torsion bar is sandwiched thereby.

3. The optical deflector according to claim 2, wherein one piezoelectric unimorph oscillating body is installed opposing another piezoelectric unimorph oscillating body in a pair such that the movable plate is sandwiched thereby.

4. The optical deflector according to claim 2, wherein
   a phase of an alternating voltage applied to the piezoelectric actuators in a position that sandwiches each of the torsion bars varies when the piezoelectric actuator is being driven.

5. The optical deflector according to claim 4, wherein
   the alternating voltage is two alternating voltages that mutually vary in phase by 180 degrees.

6. The optical deflector according to claim 5, wherein
   the alternating voltage oscillates in either a positive or a negative unimorph region by a superposition of a direct offset voltage.

7. The optical deflector according to claim 1, wherein
   each of the oscillating plates and the piezoelectric actuators is of a rectangular form, with a vertical side of each of the torsion bars being treated as a lengthwise side thereof.

8. The optical deflector according to claim 1, wherein
   a protrusion unit, which protrudes from each of the torsion bars and increases a contact surface area of each of the oscillating plate, is installed in a linking unit of each of the oscillating plates and the torsion bars.

9. The optical deflector according to claim 8, wherein
   the protrusion unit includes at least two level surfaces.

10. The optical deflector according to claim 8, wherein
    the protrusion unit includes a curved surface.

11. The optical deflector according to claim 1, wherein
    the plurality of oscillating plates is united at an end unit of a respective one of the torsion bar, is linked at a single conjoining unit to each of the torsion bars, and a cross section area of a component of the conjoining unit that links to the torsion bar is formed so as to include a smaller surface area than a total of a cross section area of the oscillating plate.

12. The optical deflector according to claim 1, wherein
    a durability of each of the oscillating plates is less than a durability of both the torsion bars and the movable plate.

13. An optical device comprising the optical deflector according to claim 1.

14. The optical deflector according to claim 1, wherein one end portion of each of the piezoelectric unimorph oscillating bodies supports one side of each of the torsion bars.

15. The optical deflector according to claim 1, wherein the respective ends of a plurality of the piezoelectric actuators that lie within a same plane are joined to the piezoelectric actuator portion fixed to the support body.

16. An optical deflector, comprising:
    a movable plate configured to reflect light;
    a pair of torsion bars configured to support movably and oscillatably the movable plate, each of the torsion bars having one end anchored to the movable plate and another end anchored to a support body; and
    piezoelectric unimorph oscillating bodies configured to cause the movable plate to rotationally oscillate, the piezoelectric unimorph oscillating bodies including a plurality of parallel oscillating plates and a plurality of piezoelectric actuators configured to drive the oscillating plates, and respective ends of more than one of the piezoelectric actuators that lie within a same plane are joined to a piezoelectric actuator portion fixed to the support body, wherein one end of each of the oscillating plates is connected to a respective one of the torsion bar, and another end of each of the oscillating plates is connected to the support body, the oscillating plates, the movable plate, the torsion bars, and the support body are formed of a unitary structure, the oscillating plates and the piezoelectric actuators of each of the piezoelectric unimorph oscillating bodies extend in a direction perpendicular to a direction in which the torsion bars extend, the oscillating plates and the piezoelectric actuators of each of the piezoelectric unimorph oscillating bodies are segmented in the direction perpendicular to the direction in which the torsion bars extend, each of the segmented oscillating plates includes one of the piezoelectric actuators, the segmented oscillating plates are combined at one combination portion, and the piezoelectric unimorph oscillating bodies and each of the torsion bars are combined at the one combination portion.

17. The optical deflector according to claim 16, wherein one end portion of each of the piezoelectric unimorph oscillating bodies supports one side of each of the torsion bars.

18. The optical deflector according to claim 16, wherein the respective ends of a plurality of the piezoelectric actuators that lie within a same plane are joined to the piezoelectric actuator portion fixed to the support body.

19. An optical deflector, comprising:
a movable plate configured to reflect light;
a pair of torsion bars configured to support movably and oscillatably the movable plate, each of the torsion bars having one end anchored to the movable plate and another end anchored to a support body; and
piezoelectric unimorph oscillating bodies configured to cause the movable plate to rotationally oscillate, the piezoelectric unimorph oscillating bodies including a plurality of oscillating plates and a plurality of piezoelectric actuators, configured to drive the oscillating plates, wherein one end of each of the oscillating plates is connected to a respective one of the torsion bar, and another end of each of the oscillating plates is connected to the support body, the oscillating plates, the movable plate, the torsion bars, and the support body are formed of a unitary structure, the piezoelectric actuator that corresponds to each of the piezoelectric unimorph oscillating bodies is a voltage film formed directly upon or over the support body, and the voltage film is formed by a reactive ion plating technique that uses an arc discharge plasma.

20. The optical deflector according to claim 19, wherein a material of the voltage film is a lead zirconate titanate (PZT), and an assembly of the film includes a ratio of titanium to zirconium within a range between 0.4:0.6 to 0.48:0.52.

21. An optical deflector, comprising:
a movable plate configured to reflect light;
a pair of torsion bars configured to support movably and oscillatably the movable plate, each of the torsion bars having one end anchored to the movable plate and another end anchored to a support body; and
piezoelectric unimorph oscillating bodies configured to cause the movable plate to rotationally oscillate, the piezoelectric unimorph oscillating bodies including a plurality of oscillating plates and a plurality of piezoelectric actuators, configured to drive the oscillating plates, wherein one end of each of the oscillating plates is connected to a respective one of the torsion bar, and another end of each of the oscillating plates is connected to the support body, the oscillating plates, the movable plate, the torsion bars, and the support body are formed of a unitary structure, the piezoelectric actuator that corresponds to each of the piezoelectric unimorph oscillating bodies is a voltage film formed directly upon or over the support body, and a polarization process is performed upon the voltage film wherein a direct voltage of at least twice a driving voltage thereof is applied to the voltage film for a duration of between a plurality of minutes and a plurality of tens of minutes, and the unimorph is driven by a polarity identical to a polarity of the polarization process.

* * * * *